(12) United States Patent
Umeki et al.

(10) Patent No.: US 6,247,382 B1
(45) Date of Patent: Jun. 19, 2001

(54) COMPOSITE MATERIAL FLYWHEEL DEVICE

(75) Inventors: Kazunobu Umeki; Noriaki Sugahara, both of Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/368,159

(22) Filed: Aug. 5, 1999

(30) Foreign Application Priority Data

Aug. 6, 1998 (JP) .................................................. 10-223248

(51) Int. Cl.$^7$ .............................. F16F 15/305; G05G 1/00
(52) U.S. Cl. ........................ 74/572; 428/299.1; 403/370; 403/372
(58) Field of Search .............................. 74/572; 428/212, 428/299.1; 384/271; 403/367, 368, 370, 372

(56) References Cited

U.S. PATENT DOCUMENTS

| | | | |
|---|---|---|---|
| 2,574,773 | * 11/1951 | Bannister | 384/271 |
| 3,106,432 | * 10/1963 | Operkuch | 384/271 |
| 3,319,098 | * 5/1967 | Hartman | 384/271 |
| 3,656,785 | * 4/1972 | Lothar | 403/370 |
| 4,176,563 | * 12/1979 | Younger | 74/572 |
| 4,289,418 | * 9/1981 | Westin et al. | 403/370 |
| 4,359,912 | * 11/1982 | Small | 74/572 |
| 4,370,899 | * 2/1983 | Swartout | 74/572 |
| 4,483,214 | * 11/1984 | Mayer | 74/572 |
| 4,765,198 | * 8/1988 | Stravrinidis | 74/572 |
| 4,776,442 | * 10/1988 | Young | 74/572 |
| 4,817,453 | * 4/1989 | Breslich, Jr. et al. | 74/572 |
| 4,821,599 | * 4/1989 | Medlicott | 74/572 |
| 4,860,611 | * 8/1989 | Flanagan et al. | 74/572 |
| 5,015,104 | * 5/1991 | Sato | 384/271 |
| 5,110,190 | * 5/1992 | Johnson | 301/55 |
| 5,209,461 | * 5/1993 | Whightsil, Sr. | 74/572 |
| 5,562,014 | * 10/1996 | Waagepetersen | 74/572 |
| 5,692,414 | * 12/1997 | Gregoire | 74/572 |
| 5,729,903 | * 3/1998 | Bitterly et al. | 29/894 |
| 5,784,926 | * 7/1998 | Maass | 74/572 |
| 5,816,114 | * 10/1998 | Gregoire et al. | 74/572 |

FOREIGN PATENT DOCUMENTS 55-82836 * 6/1980 (JP) ........................................ 74/572

OTHER PUBLICATIONS

"Fiber Composite Materials", Marks' Standard Handbook for Mechanical Engineers, Tenth Edition, McGraw Hill, pp 6–202–6–203, 1996.*

"Batteries for the 21st Century: Composite Flywheels", by Charles, E. Bakis, Engieered Materials and Systems, Penn State University, 1998.*

* cited by examiner

Primary Examiner—David A. Bucci
Assistant Examiner—Chong H. Kim
(74) Attorney, Agent, or Firm—Smith, Gambrell & Russell, LLP

(57) ABSTRACT

A flywheel structure which has a ring made from a composite material of carbon fiber reinforced plastics and a spoke member inserted in the ring. The spoke member is made from the fiber reinforced plastics having a lower modulus of elasticity than that of the ring. A tapered bush is press-fitted into a center portion of the spoke member. Both of the tapered bush and the spoke member are tightly fixed on a shaft by a first spring supported by a holder, and by a second spring urging the holder so as to effectively prevent vibrations due to looseness thereof.

7 Claims, 7 Drawing Sheets

COMPOSITE MATERIAL FLYWHEEL DEVICE

BACKGROUND OF THE INVENTION

1. Field of the Invention

The present invention pertains to a composite material flywheel device used for temporarily storing energy.

2. Description of the Related Art

The use of flywheel devices as apparatus for temporarily storing energy that is dissipated when transportation facilities, such as motor vehicles or railroad cars, are braked as well as nighttime surplus electric power that occurs in electric power systems is currently a subject under study.

While a large majority of flywheels of the flywheel devices are metallic ones, composite material flywheels made by molding a glass-fiber reinforced plastic, aramid fiber reinforced plastic or carbon-fiber reinforced plastic are also used to cater to the need for high-speed rotation.

Figure 6:
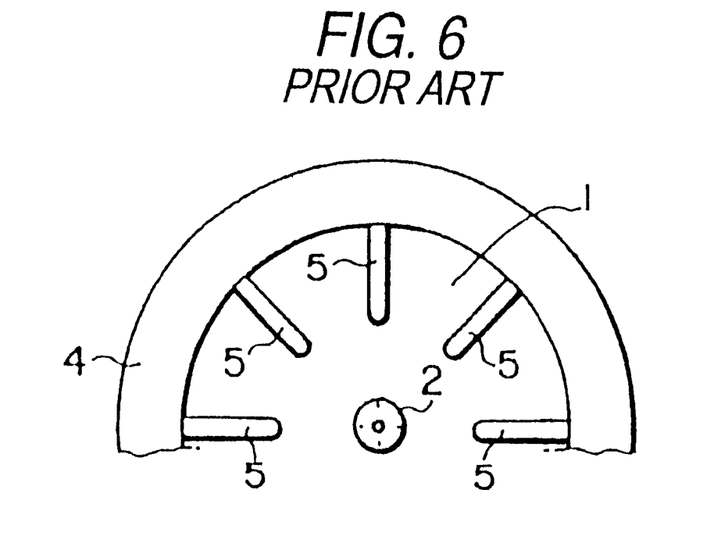
FIG. 6 is a fragmentary front view of a related art composite material flywheel.
Figure 7:
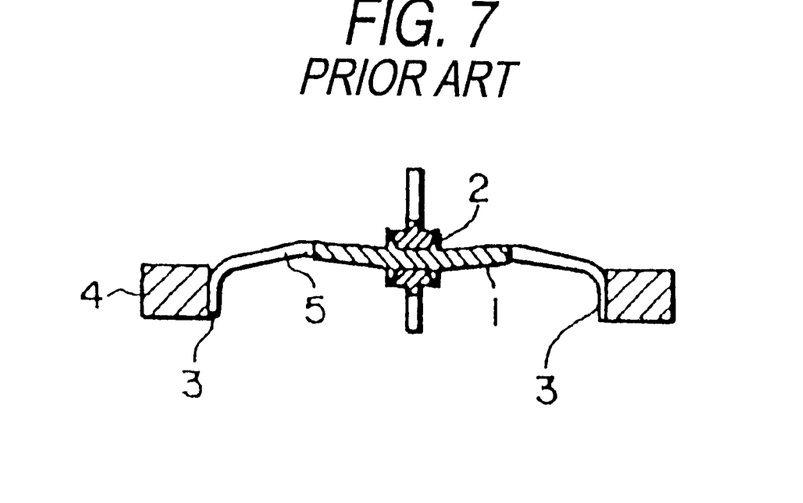
FIG. 7 is a cross-sectional view of the composite material flywheel of FIG. 6.

A composite material flywheel is described in Japanese Unexamined Patent Publication No. 58-30545, for example, in which the flywheel is of such a construction that an outer part of a rotary shaft mounting portion 2 of a circular disk 1 made of an aluminum alloy thickens toward the outer periphery, a plurality of surfaces that are nearly vertical surfaces of the rotary shaft mounting portion 2 are made to have different inclinations from one another, a ring 4 molded of a high-strength carbon-fiber reinforced plastic is firmly fitted on a cylindrical portion 3 which is formed by the outermost part of the circular disk 1, and a plurality of radially directed slits 5 are provided in the circular disk 1 and ring 4, as shown in FIGS. 6 and 7.

Figure 8:
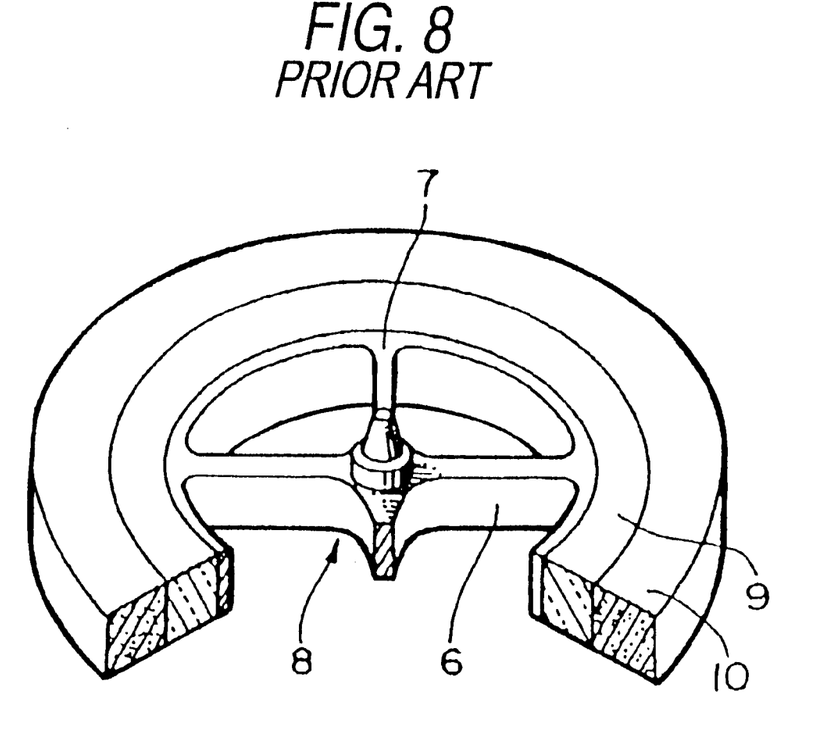
FIG. 8 is a partially cutaway perspective view of a related art composite material flywheel.

Also, a flywheel intended for storing energy is described in U.S. Pat. No. 4,569,114, for example, in which the flywheel is of a construction comprising a metallic hub 8 having a plurality of spokes 6 and a ring 7 which are one-piece molded, a glass-fiber reinforced plastic inner ring 9 provided on an outer surface of the metallic hub 8 and a carbon-fiber reinforced plastic outer ring 10 provided on an outer surface of the glass-fiber reinforced plastic inner ring 9, as shown in FIG. 8.

With the composite material flywheel in which a high-strength carbon-fiber reinforced plastic ring is firmly fitted on a cylindrical portion of a circular disk and a plurality of radially directed slits are provided in the circular disk and a ring, the ring could oscillate in its axial direction due to bending of the circular disk during high-speed rotation, making it difficult to maintain delicate geometric relationship with surrounding equipment.

Although the composite material flywheel molded of a high-strength carbon-fiber reinforced plastic allows operation at such a high rotating speed that is not achieved with glass-fiber reinforced flywheels or aramid fiber reinforced flywheels, high degrees of stress and strain occur in the interior of the flywheel and the inside diameters of the metallic circular disk and hub increase due to expansion caused by a centrifugal effect, thus creating a gap between the flywheel and its shaft. This could cause such problems as whirling or other instability-related phenomena.

Furthermore, because the ring of the metallic hub is formed of the same metal as the spokes in the aforementioned energy storage flywheel, there arises a problem related to the strength of the ring and there exist limitations in increasing the rotating speed.

SUMMARY OF THE INVENTION

This invention has been made in the light of the aforementioned problems. Accordingly, it is an object of the invention to provide a composite material flywheel which is applicable to high-speed rotation at 1,300 m/sec or above in terms of tangential speed and can alleviate strain due to residual stress and suppress whirling vibrations.

A composite material flywheel according to the invention is constructed by joining a plastic spoke member reinforced with fiber having a modulus of elasticity lower than high-strength carbon fiber to the inside of a high-strength carbon-fiber reinforced plastic ring by press-fitting means. This flywheel is applicable to high-speed rotation at 1300 m/sec or above in terms of tangential speed and can alleviate stress due to initial residual strain.

A composite material flywheel device according to the invention has a composite material flywheel in which a plastic spoke member reinforced with fiber having a modulus of elasticity lower than high-strength carbon fiber is joined to the inside of a high-strength carbon-fiber reinforced plastic ring by press-fitting means, a taper bush fitted into a truncated conical shaft hole formed in a central part of the spoke member of the composite material flywheel, and spring means which forces the taper bush toward the spoke member. As the taper bush is forced into the composite material flywheel by way of the spring means, it becomes possible to absorb looseness which occurs when the rotating speed increases and prevent whirling vibrations, and the service life of the flywheel device is increased.

DETAILED DESCRIPTION OF THE PREFERRED EMBODIMENTS

A mode of carrying out this invention is described below with reference to the drawings.

Figure 1:
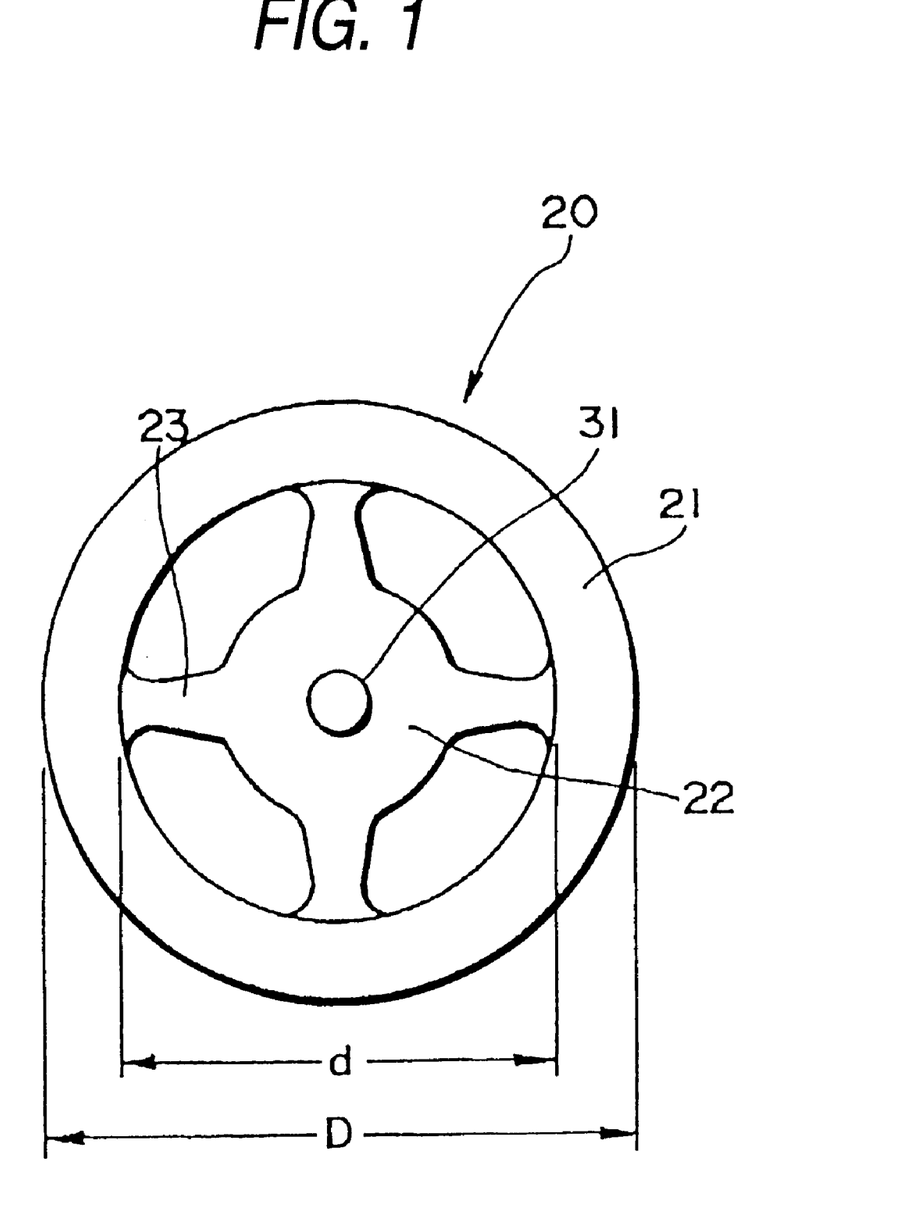
FIG. 1 is a front view of a composite material flywheel according to the present invention.

FIG. 1 shows a composite material flywheel according to the invention, in which the composite material flywheel 20 has a ring 21 molded to an inside diameter d and outside diameter D and a spoke member 22 integrally joined to the ring 21. The spoke member 22 includes four arms 23 which are molded together to form a single structure.

The aforementioned ring 21 is formed by winding a tape around an unillustrated mandrel in layers, the tape being made by aligning several strands of high-strength carbon-fiber prepreg roving material in parallel, and then joining the layered tape into a single structure by hot pressing means. (Refer to Japanese Patent Application No. 10-205510.)

The inside diameter d and outside diameter D of the aforementioned ring 21 are so determined that the ratio of the inside diameter to the outside diameter falls within a range of 0.65 to 0.75. This is for providing the ring 21 with properties to withstand high-speed rotation at a tangential speed of 1300 m/sec.

Figure 2:
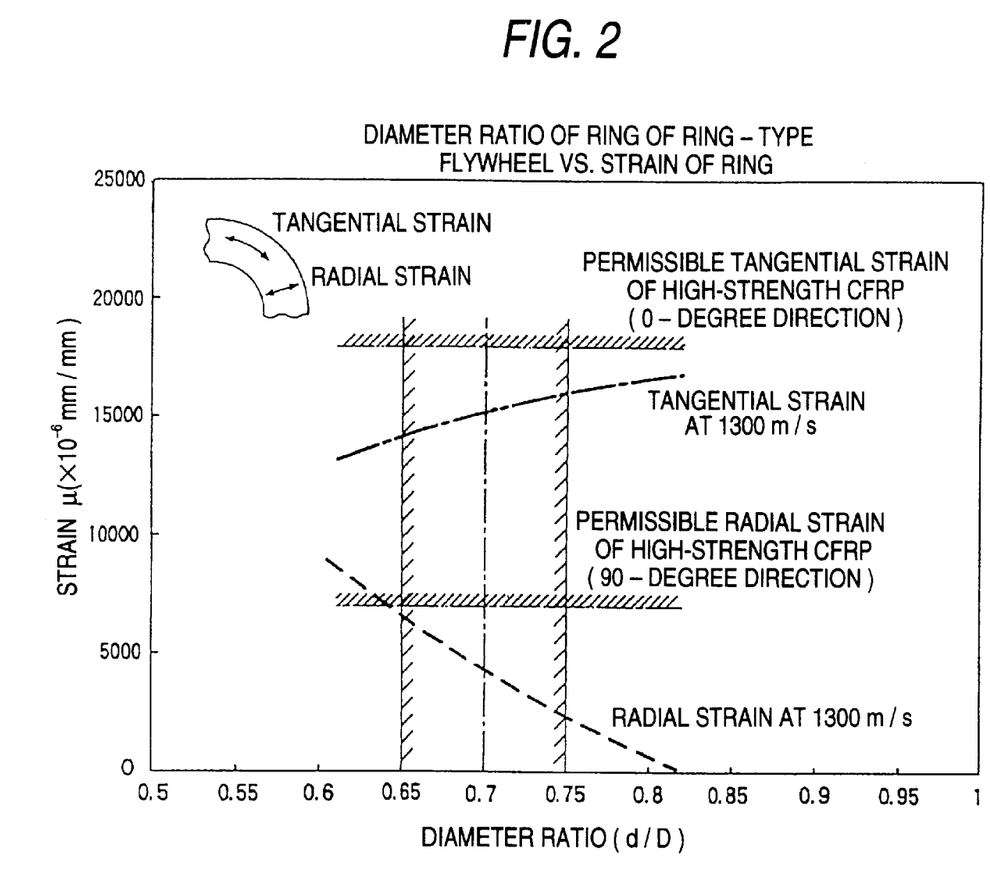
FIG. 2 is a diagram showing tangential strain at a tangential speed of 1,300 m/sec in relation to permissible tangential strain and radial strain at the tangential speed of 1300 m/sec in relation to permissible radial strain.

FIG. 2 is a graph showing tangential strain at the tangential speed of 1,300 m/sec in relation to permissible tangential strain and radial strain at the tangential speed of 1300 m/sec in relation to permissible radial strain, in which the vertical axis represents the amount of strain (micro($\times 10^{-6}$ mm/mm)) and the horizontal axis represents the diameter ratio (d/D).

In FIG. 2, a region in which the flywheel 20 can withstand high-speed rotation at the tangential speed of 1300 m/sec is shown by shading with parallel oblique lines.

Figure 3:
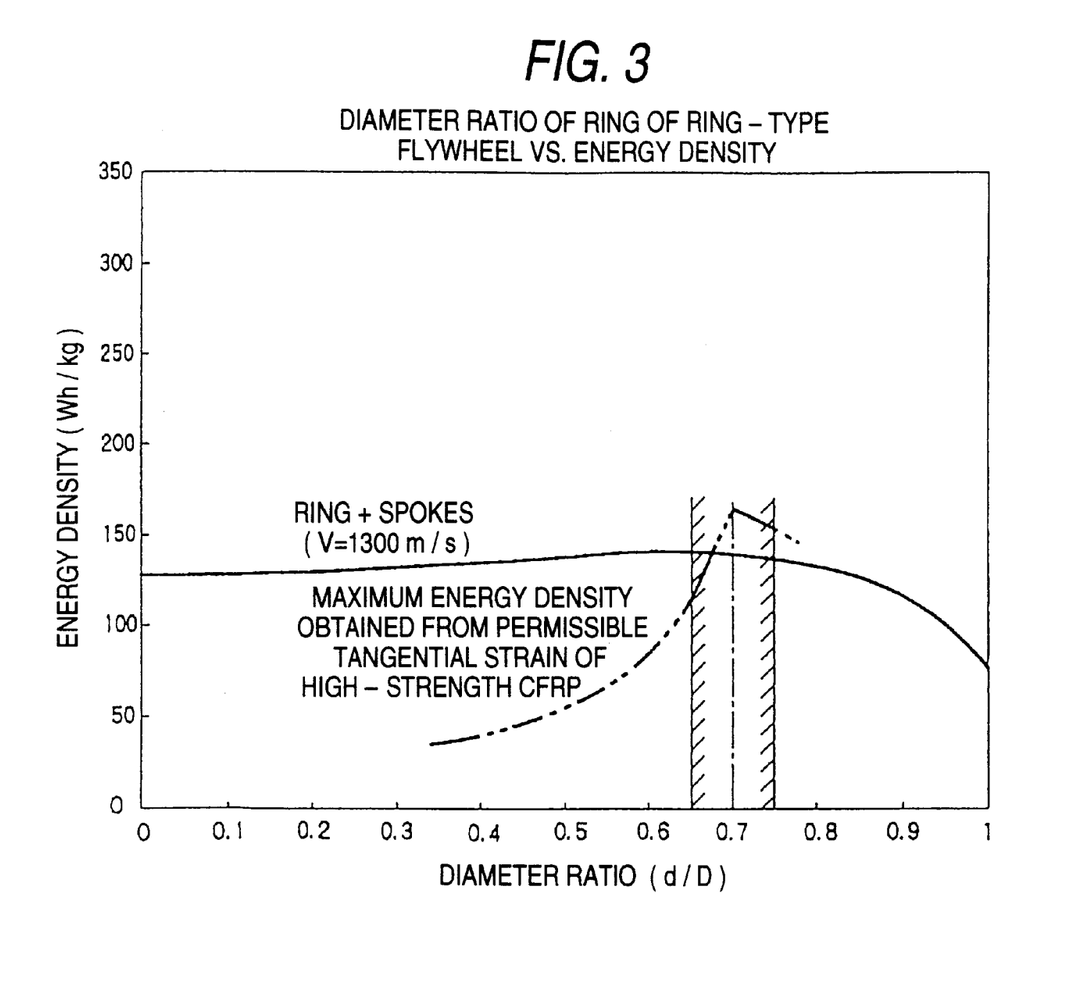
FIG. 3 is a graph showing energy density at the tangential speed of 1300 m/sec and the permissible strain of high-strength carbon-fiber reinforced plastic.

FIG. 3 is a graph showing energy density at the tangential speed of 1300 m/sec and the permissible strain of high-strength carbon-fiber reinforced plastic, in which the vertical axis represents the energy density and the horizontal axis represents the diameter ratio (d/D).

In FIG. 3, an area shown by shading with parallel oblique lines is a region in which the energy density determined by the permissible strain becomes a maximum.

It is recognized from FIGS. 2 and 3 that the ring 21 can cope with high-speed rotation at the tangential speed of 1300 m/sec by setting the ratio of the inside diameter d to the outside diameter D between 0.65 and 0.75.

The aforementioned spoke member 22 is manufactured by machining a plastic plate which has been reinforced by layering equal amounts of high-ductility, high-strength glass fibers or aramid fibers in directions of 0°, 90° and ±45° to provide capabilities to follow up extension and to withstand the centrifugal force of the spoke member 22 itself, wherein the plastic plate is machined such that the directions of the fibers match the directions of the arms 23 of the spoke member 22.

Although the four arms 23 are made by machining operation in such a way that the arms 23 align the 0° and 90° fiber directions in the spoke member 22 shown in FIG. 1, the number of arms 23 may be increased to eight by providing additional arms 23 in the ±45° directions in order to cope with even higher rotation speeds.

The composite material flywheel 20 shown in FIG. 1 is produced by joining a high-strength glass-fiber reinforced plastic spoke to a high-strength carbon-fiber reinforced plastic ring whose diameter ratio is between 0.65 and 0.75 by expansion fitting means.

More specifically, the composite material flywheel 20 is formed by cooling the spoke member 22 molded from the glass-fiber reinforced plastic to a temperature of –70° C. or less, placing the cooled spoke member 22 inside the ring 21 which has been molded from the high-strength carbon-fiber prepreg, and then returning the cooled spoke member 22 to room temperature to join the spoke member 22 with the ring 21 so that they together form a single structure. With internal stresses produced in the composite material flywheel 20 by the expansion fitting means, it is possible to alleviate the strain of the spoke member 22 caused by the centrifugal force of the composite material flywheel 20.

Figure 4:
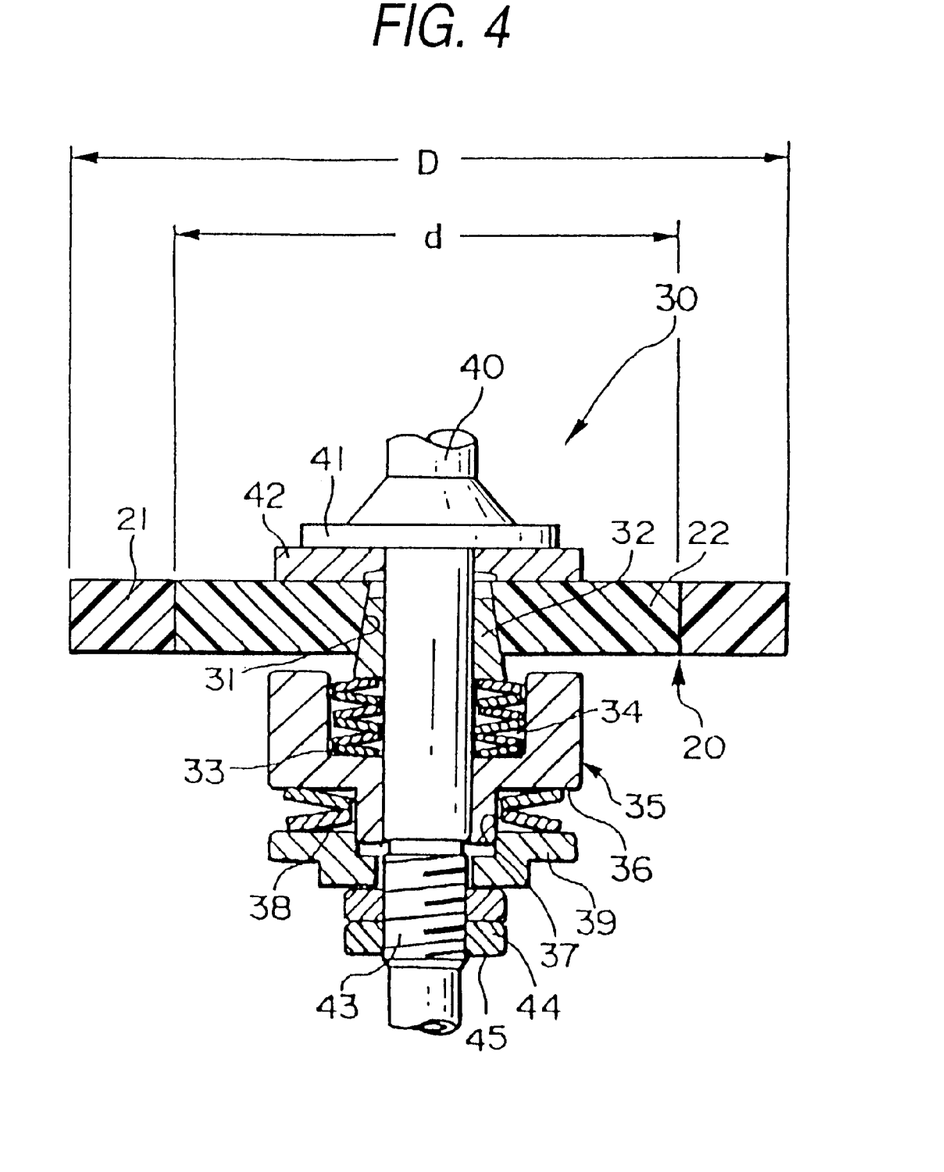
FIG. 4 is a diagram showing a composite material flywheel device according to the invention as it is in a stage prior to installation on a shaft.
Figure 5:
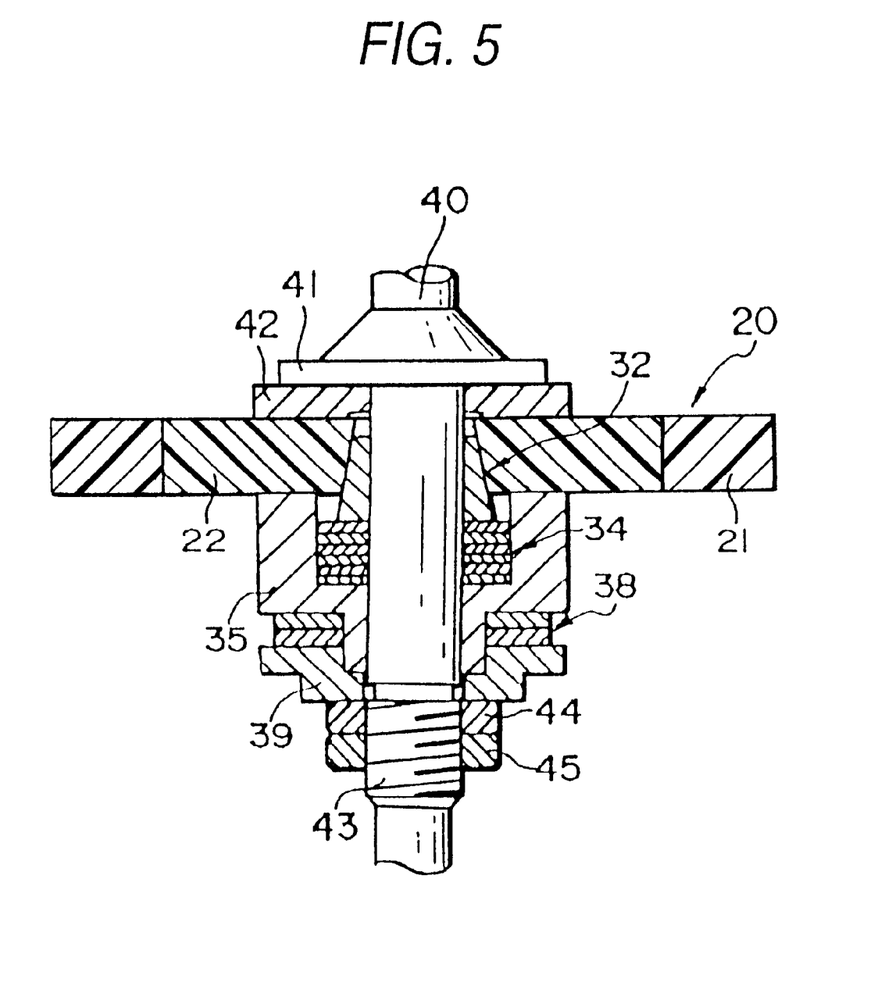
FIG. 5 is a diagram showing the composite material flywheel device according to the invention as it is in a stage after installation on the shaft.

FIG. 4 shows a composite material flywheel device 30 according to the invention as it is in a stage prior to installation on a shaft, and FIG. 5 shows the composite material flywheel device 30 according to the invention as it is in a stage after installation on the shaft.

The aforementioned composite material flywheel device 30 has a composite material flywheel 20 (FIG. 1), a truncated conical shaft hole 31 formed in a central part of the spoke member 22 of the composite material flywheel 20, a taper bush 32 which has an outside diameter corresponding to the truncated conical shaft hole 31 provided in the spoke member 22 and is fitted in the truncated conical shaft hole 31, a small disc springs 33 which force the taper bush 32 in a direction in which it is fitted into the truncated conical shaft hole 31, and a holder 35 which is provided with a pit 34 for accommodating the small disc springs 33. The small disc springs 33 produce an appropriate pushing force in a state they do not rotate so as to force the taper bush 32 toward the spoke member and thereby absorb looseness should any fluctuations occur in rotating conditions. The number of the small disc springs 33 is determined so that they would provide such a level of thrust that is sufficient to leave a pushing force while absorbing the looseness at maximum tangential speed. The holder 35 has a shoulder portion 36 and a sleeve 37 that are provided on a side opposite to the side where the pit 34 is provided. Large disc springs 38 are located on the shoulder portion 36 of the holder 35 and a plate 39 is fitted on the sleeve 37. The plate 39 pushes the large disc springs 38 located on the shoulder portion 36. The number of the large disc springs 38 is determined such that they can always push the holder 35 toward the composite material flywheel 20 depending on variations in the thickness of the composite material flywheel 20.

In FIG. 4, the reference numeral 40 designates a shaft having a stepped portion 41 and the reference numeral 42 designates a plate.

The shaft 40, plates 39, 42, bush 32, springs 34, 38, holder 35, nuts 44, 45 are all made of steel, and due consideration is taken such that an increase in inside diameter at high-speed rotation can be well ignored with the diameter of the shaft 40 set to 90 mm or less and the maximum outside diameter of the taper bush 32 set to 120 mm or less, given the outside diameter 380 mm of the ring 21.

A procedure for installing the composite material flywheel device 30 on the shaft 40 is now described below.

First, the plate 42 is mounted on the shaft 40 so that the plate 42 comes in contact with the stepped portion 41 as shown in FIG. 4. Then, the composite material flywheel 20 is mounted on the shaft 40 with a small-diameter side of the truncated conical shaft hole 31 provided in the spoke member 22 directed forward, and a surface of the composite material flywheel 20 on the small-diameter side of the truncated conical shaft hole 31 is brought into contact with the plate 42. The plate 42 has a larger diameter than the truncated conical shaft hole 31 and, thus, covers the truncated conical shaft hole 31 and sets the taper bush 32 fitted into the truncated conical shaft hole 31 in position.

Next, the holder 35 accommodating the small disc springs 33 in its pit 34 is mounted on the shaft 40 with the side of the small disc springs 33 directed forward, the large disc springs 38 are placed on the shoulder portion 36 of the holder 35, the plate 39 is mounted on the sleeve 37, and double nuts 44, 45 are screwed on a threaded portion 43 provided on the shaft 40.

When the double nuts 44, 45 have been screwed on the threaded portion 43 provided on the shaft 40, the plate 39 pushes the large disc springs 38 and the holder 35 moves along the shaft 40 up to a position where the holder 35 comes into contact with the composite material flywheel 20 as shown in FIG. 5. As a result of this movement of the composite material flywheel 20 in the axial direction, the small disc springs 33 accommodated in the pit 34 in the holder 35 push the taper bush 32 so that it is fitted into the truncated conical shaft hole 31 provided in the spoke member 22. At this point, the installation of the composite material flywheel device 30 onto the shaft 40 is completed.

Subsequently, the amount of unbalance is measured at a specified rotating speed and the plate 3, 42 or the holder 35 is trimmed to proper thickness to improve balance.

Consequently, the composite material flywheel device 30 absorbs its looseness with respect to the shaft 40 by means of the taper bush 32 and eliminates the looseness of the composite material flywheel 20 and increases its out-of-plane stiffness by sandwiching the composite material flywheel 20 between the plate 42 and the holder 35, making it possible to prevent whirling vibrations.

Although one taper bush 32 is fitted into the truncated conical shaft hole 31 provided in the composite material flywheel 20 in the foregoing embodiment, truncated conical shaft holes 31 may be formed on both sides of the composite material flywheel 20 so that two taper bushes 32 can be fitted therein in a case where the composite material flywheel 20 has a large thickness.

As thus far described, a plastic spoke member reinforced with fiber having a modulus of elasticity lower than high-strength carbon fiber is joined to the inside of a high-strength carbon-fiber reinforced plastic ring by press-fitting means in a composite material flywheel according to the invention and, as a consequence, it becomes possible to prevent disjuncture of the ring before rotation and alleviate stress due to initial residual strain and the composite material flywheel can be applied to high-speed rotation at the tangential speed of 1300 m/sec or above.

Further, a composite material flywheel device according to the invention has a composite material flywheel in which a plastic spoke member reinforced with fiber having a modulus of elasticity lower than high-strength carbon fiber is joined to the inside of a high-strength carbon-fiber reinforced plastic ring by press-fitting means, a taper bush fitted into a truncated conical shaft hole formed in a central part of the spoke member of the composite material flywheel, and spring means which forces the taper bush toward the spoke member, wherein the composite material flywheel device absorbs looseness with respect to a shaft by means of the taper bush and can prevent whirling vibrations.

While the presently preferred embodiments of the present invention have been shown and described, it is to be understood that the disclosure is for the purpose of illustration and that various changes modifications may be made without departing from the scope of the invention as set forth in the appended claims

What is claimed is:

1. A flywheel structure made from composite material, comprising:

a ring made from a first plastic material, reinforced with high strength carbon fibers;

a spoke member press-fitted inside of said ring and having a plurality of arms extending in a radial direction to said ring;

a tapered bush with a truncated cone shape provided in a center portion of said spoke member;

a first spring provided under said tapered bush for urging thereof toward said spoke member;

a holder provided under said spoke member for holding said first spring; and a second spring provided under said holder for urging thereof toward said spoke member;

wherein said spoke member is made from a second plastics material reinforced with a high strength fiber having a modulus of elasticity lower than the carbon fiber of said first plastic material.

2. The flywheel structure according to claim 1, wherein: a ratio of inside and outside diameters of said rim is between 0.65 and 0.75.

3. The flywheel structure according to claim 1, wherein; said first spring includes a disc spring.

4. The flywheel structure according to claim 1, wherein; said second spring includes a disc spring.

5. The flywheel structure according to claim 1, wherein; said spoke member is made of plastic material reinforced with glass fibers, and is press-fitted inside of said ring by expansion after freezing.

6. The flywheel structure according to claim 1, wherein; said spoke member is made of plastic material reinforced with aramid fibers and is press-fitted inside of said ring by expansion after freezing.

7. A flywheel structure made from a composite material, comprising a spoke member and a ring member, said ring member made from a first plastic material of high strength carbon fibers having a first modulus of elasticity;

a tapered bush with a truncated cone shape provided in a center portion of said spoke member;

said spoke member having a plurality of arms extended in a radial direction from said tapered bush to said ring member and press-fitted therein;

a holder provided under said spoke member for holding thereof;

a first spring provided under said tapered bush for urging thereof toward said spoke member; and, a second spring provided under said holder for urging thereof toward said spoke member;

said spoke member being made of a second plastic material containing a different fiber where the first modulus of elasticity is higher than the second modulus of elasticity, so as to be functionally applicable to a high speed operation of said flywheel by preventing said ring member from dropping out of said spoke while rotating at a high speed and to effectively relieve internal stress.

* * * * *